US012421125B1

(12) United States Patent
Ahmed (10) Patent No.: US 12,421,125 B1
(45) Date of Patent: Sep. 23, 2025

(54) PARTICULATE NANOCOMPOSITE MATERIAL

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/212,176

(22) Filed: May 19, 2025

(51) Int. Cl.
  *C01B 35/12* (2006.01)
  *B82Y 30/00* (2011.01)
  (Continued)

(52) U.S. Cl.
  CPC ........... *C01B 35/126* (2013.01); *B82Y 30/00* (2013.01); *C01B 35/127* (2013.01); *C02F 1/281* (2013.01); *C02F 1/30* (2013.01); *C01P 2002/01* (2013.01); *C01P 2002/60* (2013.01); *C01P 2002/76* (2013.01); *C01P 2002/85* (2013.01); *C01P 2004/03* (2013.01); *C01P 2004/04* (2013.01);
  (Continued)

(58) Field of Classification Search
  None
  See application file for complete search history.

(56) References Cited

U.S. PATENT DOCUMENTS 12,275,651 B1 * 4/2025 Ahmed .................. B82Y 30/00
2003/0030042 A1 * 2/2003 Sawada .................... A61K 8/27
                                                                252/604
(Continued)

FOREIGN PATENT DOCUMENTS

CN   105536691 B   12/2018
CN   107640750 B   12/2020
(Continued)

OTHER PUBLICATIONS

Mazeyar Parvinzadeh Gashti, et al., "Hydrogel-assisted low-temperature synthesis of calcium borate nanoparticles", Journal of the Australian Ceramic Society, vol. 54, Apr. 10, 2018, pp. 601-607.

*Primary Examiner* — John J Figueroa
(74) *Attorney, Agent, or Firm* — Oblon, McClelland, Maier & Neustadt, L.L.P.

(57) ABSTRACT

A particulate nanocomposite material comprising, as determined by X-ray diffraction (XRD): elemental carbon (C); elemental nickel (Ni) in a cubic crystalline phase; a cubic nickel oxide (NiO) crystalline phase; an orthorhombic calcium borate ($CaB_2O_4$) crystalline phase; and, a magnesium borate ($MgB_2O_4$) crystalline phase. The particulate nanocomposite material is characterized in that, based on the total number of atoms in the nanocomposite material: the atomic concentration of carbon is from about 1 atomic percent (at. %) to about 10 at. %; the atomic concentration of nickel is from about 1 at. % to about 10 at. %; the atomic concentration of boron (B) is from about 1 at. % to about 10 at. %; the atomic concentration of magnesium (Mg) is from about 5 at. % to about 15 at. %; and, the atomic concentration of calcium (Ca) is from about 1 at. % to about 10 at. %.

20 Claims, 5 Drawing Sheets

(51) Int. Cl.
   *C02F 1/28* (2023.01)
   *C02F 1/30* (2023.01)
   *C02F 101/10* (2006.01)

(52) U.S. Cl.
   CPC ...... *C01P 2004/32* (2013.01); *C01P 2004/50* (2013.01); *C01P 2004/82* (2013.01); *C02F 2101/10* (2013.01)

(56) References Cited

U.S. PATENT DOCUMENTS

| | | | | |
|---|---|---|---|---|
| 2009/0262763 | A1* | 10/2009 | Pan | C01B 35/128 |
| | | | | 117/3 |
| 2009/0326134 | A1* | 12/2009 | Berzinis | B82Y 30/00 |
| | | | | 524/445 |
| 2012/0132865 | A1* | 5/2012 | Nakamura | C01B 32/16 |
| | | | | 252/511 |
| 2016/0194223 | A1* | 7/2016 | Landis | C02F 1/46104 |
| | | | | 204/666 |
| 2019/0127222 | A1* | 5/2019 | Yao | B01J 19/0013 |

FOREIGN PATENT DOCUMENTS

| | | |
|---|---|---|
| IN | 202211051623 A | 3/2024 |
| JP | 5038257 B2 | 10/2012 |

\* cited by examiner

PARTICULATE NANOCOMPOSITE MATERIAL

BACKGROUND

Technical Field

The present disclosure is directed towards a nanocomposite material, and more particularly, relates to a particulate nanocomposite material and a method of preparation thereof, wherein the particulate nanocomposite material has utility in immobilizing inorganic contaminants and degrading organic pollutants.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Research on nanocomposite materials for environmental remediation has focused on developing multifunctional nanostructures for pollutant removal. Silica, zinc, and lead based nanostructures have been explored, but their separate or simple combinations lack the required synergy for complex environmental challenges. Existing art has primarily focused on synthesizing nanocomposites with controlled properties; however, the present methods face several limitations, including challenges in achieving precise phase composition, uniform morphology, and enhanced crystallinity. Conventional synthesis methods often lead to inconsistencies in material characteristics, which hinder their widespread applicability in advanced technological applications.

Multiphase nanostructured metal oxides have gained interest as an evolution from coarse-grained or single-phase materials. Reducing particle size below 100 nanometers (nm) significantly enhances mechanical, thermal, optical, and electrical properties. Materials of these dimensions also exhibit greater phase stability, as multiple phases within a matrix restrict particle growth during thermal processing. Achieving uniform phase distribution in the nanocomposite matrix is crucial for maintaining stability and optimizing performance.

Various synthesis methods have been employed to control microstructure and element distribution, but most do not succeed in achieving both desiderata due to complex chemical and thermal interactions. Some methods enable nanoscale particles and phase homogeneity but require multiple thermal processing steps. The use of particulate fillers initially served to reduce material costs but later emerged as a means to enhance mechanical, thermal, and physical properties. However, achieving good dispersion remains a challenge, as nanoparticles alter material viscosity, often necessitating the use of solvents in the synthetic methods.

Current composite materials face limitations in adsorption capacity, scalability, and adaptability, particularly in heavy metal pollutant removal. Many synthesis methods for such materials are complex, energy-intensive, or reliant on costly precursors, restricting large-scale applications. Addressing these challenges requires innovative approaches to develop high-performance nanocomposites with improved efficiency and environmental applicability.

Accordingly, one object of the present disclosure is to provide a particulate nanocomposite material, and a method of synthesizing thereof, that may circumvent the drawbacks and limitations, such as, high energy consumption, lengthy processing times, costly precursors, agglomeration, and scalability issues, of the materials and methods already known in the art.

SUMMARY

In an exemplary embodiment, a particulate nanocomposite material, as determined by X-ray diffraction (XRD), is described. The particulate nanocomposite material comprises: elemental carbon (C); an orthorhombic calcium borate ($CaB_2O_4$) crystalline phase; a triclinic magnesium borate ($Mg_2B_2O_5$) crystalline phase; and, a monoclinic zinc borate ($Zn_3B_2O_6$) crystalline phase. In the porous particulate nanocomposite material and based on the total number of atoms in the nanocomposite material: the atomic concentration of carbon is from about 1 atom percent (at. %) to about 5 at. %; the atomic concentration of boron (B) is from about 1 at. % to about 10 at. %; the atomic concentration of magnesium (Mg) is from about 5 at. % to about 15 at. %; the atomic concentration of calcium (Ca) is from about 5 at. % to about 15 at. %; and, the atomic concentration of zinc (Zn) is from about 5 at. % to about 15 at. %.

In some embodiments, the particulate nanocomposite material has, based on the total number of atoms in the nanocomposite material: an atomic concentration of carbon of from about 1 at. % to about 4 at. %; an atomic concentration of boron (B) of from about 2 at. % to about 8 at. %; an atomic concentration of magnesium (Mg) of from about 6 at. % to about 12 at. %; an atomic concentration of calcium (Ca) of from about 6 at. % to about 12 at. %; and, an atomic concentration of zinc (Zn) of from about 6 at. % to about 12 at. %.

In some embodiments, the particulate nanocomposite has a volume average crystallite size, as determined by X-ray diffraction, of from about 75 nanometers (nm) to about 85 nm.

In some embodiments, the particulate nanocomposite has a volume average crystallite size, as determined by X-ray diffraction, of from about 79 nm to about 81 nm.

In some embodiments, the particulate nanocomposite comprises substantially spherical particles and agglomerates thereof.

In some embodiments, the particulate nanocomposite comprises linear agglomerates of substantially spherical particles.

In some embodiments, the particulate nanocomposite comprises granular particles distributed on the surface of the linear agglomerates.

In another exemplary embodiment, a method for preparing the particulate nanocomposite material is described. The method comprises: forming an aqueous mixture by adding an aqueous solution of a chelating agent to an aqueous solution of a magnesium salt, a calcium salt, a zinc salt and boric acid; adding a polyol into the aqueous mixture to form a gel; heating the gel under stirring at a temperature of from about 200° C. to about 400° C. for a sufficient duration to form a dry powder; and. calcining the dry powder at a temperature of from about 500° C. to about 800° C. to form the nanocomposite material.

In some embodiments, the aqueous solution of the chelating agent is added in a dropwise manner into the aqueous solution of the magnesium salt, the calcium salt, the zinc salt and boric acid.

In some embodiments: the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$); the zinc salt is selected from the group consisting of zinc sulfate ($ZnSO_4$), zinc nitrate ($Zn(NO_3)_2$), zinc chloride ($ZnCl_2$) and zinc acetate ($Zn(CH_3COO)_2$); and, the calcium salt is selected from the group consisting of calcium sulfate ($CaSO_4$), calcium nitrate ($Ca(NO_3)_2$), calcium chloride ($CaCl_2$) and calcium acetate ($Ca(CH_3COO)_2$).

In some embodiments: the magnesium salt is magnesium nitrate ($Mg(NO_3)_2$); the zinc salt is zinc nitrate ($Zn(NO_3)_2$); and, the calcium salt is calcium nitrate ($Ca(NO_3)_2$).

In some embodiments, the chelating agent includes at least one hydroxyalkyl carboxylic acid selected from the group consisting of citric acid, tartaric acid, malic acid, mandelic acid and 12-hydroxystearic acid.

In some embodiments, the chelating agent comprises or consists of tartaric acid.

In some embodiments, the polyol is added in a dropwise manner into the aqueous mixture.

In some embodiments, the polyol has a number average molecular weight (Mn) of from about 200 grams per mole (g/mol) to about 5000 g/mol. and a hydroxyl number of from about 25 milligrams of potassium hydroxide per gram (mg KOH/g). to about 500 mg KOH/g In some embodiments, the polyol is selected from the group consisting of polyester polyols, polyether polyols, poly(ether-ester) polyols, poly(alkylene carbonate) polyols, and mixtures thereof.

In some embodiments, the polyol comprises a polyoxy ($C_2$-$C_3$)alkylene polyol.

In some embodiments, the polyol comprises a polyoxy ($C_2$-$C_3$)alkylene polyol having a number average molecular weight (Mn) of from about 200 g/mol to about 5000 g/mol. and an hydroxyl number of from about 25 mg KOH/g to about 500 mg KOH/g.

In yet another exemplary embodiment, a method of immobilizing inorganic contaminants disposed in an aqueous medium is described. The method includes contacting the aqueous medium with the aforementioned particulate nanocomposite material.

In yet another exemplary embodiment, a method of degrading organic pollutants disposed in an aqueous medium is described. The method includes contacting the aqueous medium with the aforementioned particulate nanocomposite material, while irradiating the aqueous medium with actinic irradiation.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'room temperature' refers to a temperature range of 23 degrees Celsius (° C.)±2° C. in the present disclosure. As used herein, 'ambient conditions' means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term 'fraction' refers to a numerical quantity which defines a part up to, but not including, 100 percent or the entirety of the thing in question.

As used herein the term 'disposed' refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

As used herein, the term 'high-resolution transmission electron microscopy (HRTEM)' refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

An orthorhombic crystalline phase refers to a crystal structure having three mutually perpendicular axes of unequal lengths ($a \neq b \neq c$). This means the crystal lattice forms a rectangular prism where the edges represent the three axes, all intersecting at 90-degree angles ($\alpha=\beta=\gamma=90°$).

A triclinic crystalline phase references a crystal system that is characterized by three axes of unequal lengths ($a \neq b \neq c$) intersecting at arbitrary angles, none of which are at 90 degrees. The triclinic system is the least symmetrical and most general class of the seven crystal systems.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, the term 'particle' refers to a small object that acts as a whole unit with regard to its transport and properties. As used herein, 'nanoparticles'—sometimes contracted herein to NPs—refers to particles having a particle size of 1 nanometer (nm) to 1000 nm.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term 'nanocomposite' refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term 'porosity' refers to a measure of the void or vacant spaces within a material. As used herein, the term 'pore volume' refers to the total volume of void spaces (pores) within a material that is capable of being filled by a gas or liquid: it is typically expressed in cubic centimeters per gram ($cm^3/g$).

As used herein, the Brunauer-Emmett-Teller (BET) analysis references the method of measuring the specific surface area ($m^2/g$) of a solid material via the adsorption of gas molecules onto the surface of the solid, as detailed in standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134: 1998-02.

As used herein, the term 'porous particulate nanocomposite' refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant (ε) of more than 5 as measured at 25° C. The determination of dielectric constant (ε) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'alkylene' refers to a divalent radical derived from an alkyl group as defined above.

The term 'polyoxyalkylene'—alternatively referenced as polyalkylene oxide—refers herein to an aliphatic polyether which is built from repeated —O-A- units, wherein A is alkylene, for instance $C_2$-$C_5$ alkylene. The term 'polyoxy($C_2$-$C_3$)alkylene' encompasses polyoxyethylene, polyoxypropylene and poly(oxyethylene-co-oxypropylene).

The term 'polyol' as used herein shall include diols and higher functionality hydroxyl compounds. The term 'polyether polyol' refers to a compound, which may be linear or branched, that contains at least two ether groups and at least two hydroxyl groups. The term 'polyester polyol' references a polymeric compound, which may be linear or branched, that contains at least two ester linkages and at least two hydroxyl groups. Correspondingly, the term 'poly(ether-ester) polyol' refers to a polyol containing both ether linkages (C—O—C) and ester linkages (R—COO—R) within its structure.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'organic pollutant' refers to a type of pollutant that contains carbon-based compounds, generally originating from human activities. These pollutants may come from sources such as pesticides, industrial chemicals, plastics, and solvents. They tend to be harmful to the environment and living organisms, as they can be toxic, persistent, and bioaccumulate in ecosystems. Examples include substances such as benzene, dichlorodiphenyl-trichloroethane (DDT), and polychlorinated biphenyls (PCBs). Herein, the organic pollutant may be a dye, a phenol, a polycyclic aromatic hydrocarbon, an herbicide, a pesticide, a persistent organic pollutant, and so on.

An aspect of the present disclosure is directed to a $CaB_2O_4/Mg_2B_2O_5/Zn_3B_2O_6/C$ particulate nanocomposite material synthesized via the Pechini sol-gel method. The particulate nanocomposite material exhibits high crystallinity, nanoscale features, and uniform composition.

A particulate nanocomposite material is described. The particulate nanocomposite material comprises, as determined by X-ray diffraction: elemental carbon; an orthorhombic $CaB_2O_4$ crystalline phase; a triclinic $Mg_2B_2O_5$ crystalline phase; and, a monoclinic $Zn_3B_2O_6$ crystalline phase. In some embodiments, the particulate nanocomposite material has a volume average crystallite size in range of from about 75 to about 85 nm, for example about 77 to about 83 nm, about 79 to about 81 nm, or about 80 to about 81 nm. In a preferred embodiment, the particulate nanocomposite material has a volume average crystallite size of 80.67 nm.

In some embodiments, the pores of the porous particulate nanocomposite material may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than about 2 nm. The term 'mesoporous' means the pores of the nanocomposite have an average pore width of from about 2 to about 50 nm. The term 'macroporous' means the pores of nanocomposite have an average pore width larger than about 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, the porous particulate nanocomposite may possess a morphology comprising nanosheets, nanowires, nanospheres, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanoboxes, nanobeads, nanobelts, nano-urchins, nanoflowers, nanostars, tetrapods, and mixtures thereof.

In some embodiments, the particulate nanocomposite comprises substantially spherical particles and agglomerates thereof. More particularly, the particulate nanocomposite may comprise linear agglomerates of substantially spherical particles. In certain circumstances, the particulate nanocomposite material may comprise granular particles distributed on the surface of the linear agglomerates of substantially spherical particles.

In some embodiments, the particulate nanocomposite material has an average grain size, as determined by SEM, ranging from about 80 to about 100 nm, for example about 85 to about 100 nm, from about 90 to about 100 nm, or from about 95 to about 100 nm. In a preferred embodiment, the particulate nanocomposite material has an average grain size of 95.64 nm.

The particulate nanocomposite material has an atomic concentration of carbon (C) ranging from 1 to about 5 atom %, for example from 1 to about 4 atom %, from about 1 to about 3 atom %, or from about 1 to about 2 atom %, based on the total number of atoms in the particulate nanocomposite material. In a preferred embodiment, the particulate nanocomposite material has an atomic concentration of carbon (C) of 3.6 atom %, based on the total number of atoms in the particulate nanocomposite material.

In some embodiments, the particulate nanocomposite material has an atomic concentration of boron (B) ranging from 1 to about 10 atom %, for example from about 2 to about 8 atom %, from about 3 to about 7 atom %, or from about 4 to about 6 atom %, based on the total number of atoms in the nanocomposite material. In a preferred embodiment, the particulate nanocomposite material has an atomic concentration of boron (B) of 5.3 atom %, based on the total number of atoms in the particulate nanocomposite material.

In some embodiments, the particulate nanocomposite material has an atomic concentration of magnesium (Mg) ranging from 5 to about 15 atom %, for example from about 6 to about 12 atom %, from about 7 to about 13 atom %, or from about 8 to about 10 atom %, based on the total number of atoms in the particulate nanocomposite material. In a preferred embodiment, the particulate nanocomposite material has an atomic concentration of magnesium (Mg) of 9.9 atom %, based on the total number of atoms in the particulate nanocomposite material.

In some embodiments, the particulate nanocomposite material has an atomic concentration of calcium (Ca) ranging from 5 to about 15 atom %, for example from about 6 to about 12 atom %, from about 7 to about 13 atom %, or from about 8 to about 10 atom %, based on the total number of atoms in the particulate nanocomposite material. In a preferred embodiment, the particulate nanocomposite material has an atomic concentration of calcium (Ca) of 10.2 atom %, based on the total number of atoms in the particulate nanocomposite material.

In some embodiments, the particulate nanocomposite material has an atomic concentration of zinc (Zn) ranging from 5 to about 15 atom %, for example from about 6 to about 12 atom %, from about 7 to about 13 atom %, or from about 8 to about 10 atom %, based on the total number of atoms in the particulate nanocomposite material. In a preferred embodiment, the nanocomposite has an atomic concentration of zinc (Zn) of 9.4 atom %, based on the total number of atoms in the particulate nanocomposite material.

Figure 1A:
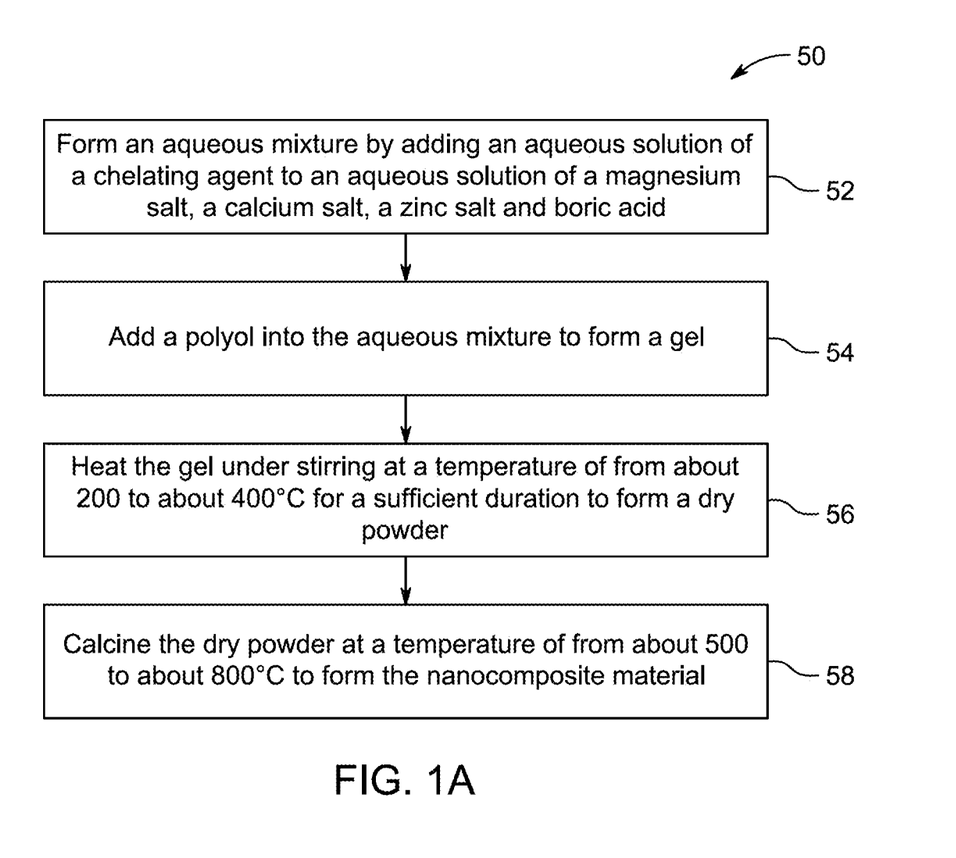
FIG. 1A illustrates an exemplary flow chart for a method of producing a $CaB_2O_4/Mg_2B_2O_5/Zn_3B_2O_6/C$ nanocomposite material, according to certain embodiments.

FIG. 1A illustrates a schematic flow chart of a method 50 of preparing the particulate nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming an aqueous mixture by adding an aqueous solution of a chelating agent to an aqueous solution of a magnesium salt, a calcium salt, a zinc salt and boric acid. The aqueous solution of the chelating agent is desirably added in a dropwise manner into the aqueous solution of the magnesium salt, the calcium salt, the zinc salt and boric acid.

In some embodiments, the magnesium salt may include but is not limited to magnesium sulfate, magnesium chloride, magnesium acetate, magnesium hydroxide, magnesium carbonate, magnesium citrate, magnesium oxide, magnesium bromide, magnesium fluoride, magnesium tartrate, magnesium phosphate, magnesium lactate, magnesium gluconate, magnesium ascorbate, magnesium stearate, magnesium malate, magnesium silicate, magnesium perchlorate, magnesium borate, magnesium pyrophosphate, magnesium hypophosphite, magnesium formate, magnesium succinate, magnesium salicylate, magnesium valerate, magnesium benzoate, magnesium iodide, magnesium fumarate, magnesium mandelate, and magnesium propionate. In some embodiments, the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$). In a preferred embodiment, the magnesium salt is magnesium nitrate ($Mg(NO_3)_2$).

In some embodiments, the zinc salt may include but is not limited to zinc chloride, zinc acetate, zinc sulfate, zinc oxide, zinc carbonate, zinc nitrate, zinc bromide, zinc iodide, zinc sulfate heptahydrate, zinc chloride hexahydrate, zinc acetate dihydrate, zinc nitrate tetrahydrate, zinc thiocyanate, zinc formate, zinc methanesulfonate, zinc isothiocyanate, zinc citrate, zinc pyrophosphate, zinc orthophosphate, zinc laurate, zinc stearate, zinc benzoate, zinc salicylate, zinc hydroxide, zinc peroxysulfate, zinc tartrate, zinc lactate, zinc picrate, zinc gluconate, and zinc ascorbate. In some embodiments, the zinc salt is selected from the group consisting of zinc sulfate ($ZnSO_4$), zinc nitrate ($Zn(NO_3)_2$), zinc chloride ($ZnCl_2$) and zinc acetate ($Zn(CH_3COO)_2$). In a preferred embodiment, the zinc salt is zinc nitrate ($Zn(NO_3)_2$) or a hydrate thereof, such as $Zn(NO_3)_2 \cdot 6H_2O$.

In some embodiments, the calcium salt may include, but is not limited to, calcium chloride, calcium sulfate, calcium carbonate, calcium hydroxide, calcium oxide, calcium acetate, calcium citrate, calcium lactate, calcium gluconate, calcium phosphate, calcium ascorbate, calcium benzoate, calcium malate, calcium fumarate, calcium oxalate, calcium stearate, calcium tartrate, calcium salicylate, calcium formate, calcium propionate, calcium valerate, calcium succinate, calcium iodide, calcium bromide, calcium fluoride, calcium thiocyanate, calcium perchlorate, calcium chromate, calcium molybdate, and calcium tungstate. In some embodiments, the calcium salt is selected from the group consisting of calcium sulfate ($CaSO_4$), calcium nitrate ($Ca(NO_3)_2$), calcium chloride ($CaCl_2$) and calcium acetate ($Ca(CH_3COO)_2$). In a preferred embodiment, the calcium salt is calcium nitrate ($Ca(NO_3)_2$) or a hydrate thereof, such as $Ca(NO_3)_2 \cdot 4H_2O$.

In some embodiments, the chelating agent includes at least one hydroxyalkyl carboxylic acid selected from the group consisting of citric acid, tartaric acid, malic acid, mandelic acid, and 12-hydroxystearic acid. In certain embodiments, salts or esters of said hydroxyalkyl carboxylic acids may be utilized.

Further exemplary chelating agents which may be present in addition to the aforementioned hydroxyalkyl carboxylic acids include, but are not limited to: isosteric acid; isocitric acid; aconitic acid; carboxylic acids, which may be saturated or unsaturated; dicarboxylic acids, which may be saturated or unsaturated and of which examples include adipic acid, fumaric acid, glutaconic acid, muconic acid, citraconic acid and succinic acid; tricarboxylic acids; aminopolycarboxylic acids, polycarboxylic acids; salts of said acids; or, esters of said acids. In some embodiments, the chelating agent may include one or more of disodium edetate, trisodium edetate, lactic acid, sodium polyphosphate, sodium metaphosphate or gluconic acid, and salicylic acid.

In some alternate embodiments, the chelating agent comprises or consists of tartaric acid. Tartaric acid includes natural and commercial forms of the acid. In some embodiments, tartaric acid is D-tartaric acid, L-tartaric acid, achiral tartaric acid or racemic mixture of D- and L-tartaric acid forms.

At step 54, the method 50 includes adding a polyol into the aqueous mixture to form a gel. The polyol is desirably added in a dropwise manner into the aqueous mixture. In some embodiments, the polyol has a number average molecular weight of from about 200 to about 5000 g/mol. and an hydroxyl number of from about 25 to about 500 mg KOH/g.

Typically herein, the polyol has: a number average molecular weight of from about 200 to about 5000 g/mol., preferably from about 200 to about 1000 g/mol. and more preferably from 200 to 500 g/mol.; and, a hydroxyl number of from about 25 to about 500 mg, more preferably 200 to 500 mg, and yet more preferably 200 to 300 mg KOH/g.

The polyols having utility in the present disclosure may be monomeric compounds, for instance monomeric aliphatic, cycloaliphatic or aromatic compounds having from 2 to 6 hydroxyl groups per molecule. Exemplary monomeric diols, which may be used alone or in combination include: ethylene glycol; propylene glycol; 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxalkylene glycols, such as diethylene glycol, dipropylene glycol, triethylene glycol, tetraethylene glycol, tripropylene glycol and tetrapropylene glycol; and, aromatic diols such as bisphenol A, bisphenol F, hydrogenated bisphenol A and hydrogenated bisphenol F. Exemplary triols, which may be used alone or in combination include: 1,2,3-propanetriol; 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol. Exemplary tetrols and pentols include: 2,2-bis(hydroxymethyl)propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol).

The present disclosure also provides for the use of polymeric polyols. In an embodiment, the polyol is selected from the group of: polyester polyols; polyether polyols; poly(ether-ester) polyols; poly(alkylene carbonate) polyols; and, mixtures thereof.

Polycarbonate diols having utility herein may be obtained by reacting carbonic acid derivatives with diols. Exemplary carbonic acid derivatives are diaryl carbonates including but not limited to diphenyl carbonate, di($C_1$-$C_6$)alkyl carbonates and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and, mixtures thereof.

Polyester diols having utility herein may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid; maleic acid; sebacic acid; azelaic acid; terephthalic acid; isophthalic acid; o-phthalic acid; tetrahydrophthalic acid; hexahydrophthalic acid; trimellitic acid; and, 1,4-cyclohexanedicarboxylic acid. Examples of suitable anhydrides include succinic, o-phthalic and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and, mixtures thereof.

Other useful polyester diols are those obtainable from diol initiated polymerization of hydroxycarboxylic acids containing from 2 to 12 carbon atoms or a lactone thereof. The hydroxycarboxylic acids may be saturated or unsaturated, linear or branched, of which example include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, $(C_1-C_6)$alkyl—valerolactone, ϵ-caprolactone and $(C_1-C_6)$alkyl-ϵ-caprolactone.

In an embodiment, the polyol is a polyether polyol. Exemplary polyether polyols may be obtained from the polymerization of a cyclic oxide—such as ethylene oxide, propylene oxide or butylene oxide—or by the addition of one or more such oxides to polyfunctional initiators having at least two active hydrogen atoms, such as water, polyhydric alcohols, polythiols, polyamines and alkanolamines.

In a preferred embodiment, the polyol comprises a polyoxy$(C_2-C_3)$alkylene polyol having: a number average molecular weight of from about 200 to about 5000 g/mol.; and, an hydroxyl number of from about 25 to about 500 mg KOH/g. For example, the polyol may comprise a polyoxy$(C_2-C_3)$alkylene polyol having: a number average molecular weight of from about 200 to about 1000 g/mol. or from about 200 to about 500 g/mol; and, an hydroxyl number of from about 200 to about 500 mg KOH/g. or from about 200 to 300 mg KOH/g. Polyethylene glycol (PEG) 400 may be mentioned as an exemplary polyoxy$(C_2-C_3)$alkylene polyol.

At step 56, the method 50 includes heating the gel under stirring at a temperature of from about 200 to about 400° C. for a sufficient duration to form a dry powder. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns. In some embodiments, the gel is heated at a temperature in a range from about 200 to about 400° C., for example about 250 to about 400° C., from about 300 to about 400° C., or from about 350 to about 400° C. In a preferred embodiment, the gel is heated at about 250° C.

At step 58, the method 50 includes calcining the dry powder at a temperature of from about 500 to about 800° C. to form the nanocomposite material. In some embodiments, the solid is calcined at a temperature in a range from about 500 to about 800° C., for example about 550 to about 800° C., about 600 to about 800° C., about 650 to about 800° C., about 700 to about 800° C. or from about 750 to about 800° C. In a preferred embodiment, the solid is calcined at about 600° C.

In some embodiments, the solid is calcined for a duration of from about 1 to about 5 hours, for example from about 1.5 to about 5 hours, from about 2 to about 5 hours, from about 2.5 to about 5 hours, from about 3 to about 5 hours, from about 3.5 to about 5 hours, from about 4 to about 5 hours, from about 4.5 to about 5 hours, or from about 2 to about 4 hours. In a preferred embodiment, the solid is calcined for about 3 hours.

The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to about 50° C./min, such as up to about 40° C./min, up to about 30° C./min, up to about 20° C./min, up to about 10° C./min, or up to about 5° C./min.

It is not precluded in the present method, that the particles directly obtained from the calcination step may be subjected to at least one of comminution, homogenization or classification in order to moderate the particle size distribution thereof.

In another aspect, a method of immobilizing inorganic pollutants disposed in an aqueous medium includes contacting the aqueous medium with the porous particulate nanocomposite material. In some embodiments, the inorganic pollutants may include heavy metals such as Pb, mercury Hg, Cd, and As, as well as radioactive isotopes like cesium-137 (Cs-137) and strontium-90 (Sr-90). These pollutants are commonly found in industrial wastewater, mining effluents, and other polluted environments, and they can be efficiently removed or neutralized through various treatment methods, including photocatalytic degradation or adsorption onto nanocomposite materials.

A method of degrading organic pollutants disposed in an aqueous medium is still further described. The method includes contacting the aqueous medium under actinic irradiation with the porous particulate nanocomposite material as described herein.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants.

The methods of immobilizing inorganic contaminants and of photocatalytic degradation of organic pollutants both require an aqueous medium to be brought into contact with the porous particulate nanocomposite material for a sufficient contact time to permit adsorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the porous particulate nanocomposite material. In this embodiment, the porous particulate nanocomposite material may need to constrained within a bed or membrane which the aqueous medium contacts as either a perpendicular or tangential (cross-) flow stream.

The following examples are provided solely for illustration and are not to be construed as limitations of the present disclosure, as many variations thereof are possible without departing from the spirit and scope of the present disclosure.

EXAMPLES

The following examples demonstrate a particulate $CaB_2O_4/Mg_2B_2O_5/Zn_3B_2O_6/C$ nanocomposite and method of preparation thereof for the immobilization of inorganic contaminants and degradation of organic pollutants. The examples are provided solely for illustration and are not to be construed as limitations of the present disclosure, as many variations thereof are possible without departing from the spirit and scope of the present disclosure.

Example 1: Synthesis of $CaB_2O_4/Mg_2B_2O_5/Zn_3B_2O_6/C$ nanocomposite

Figure 1B:
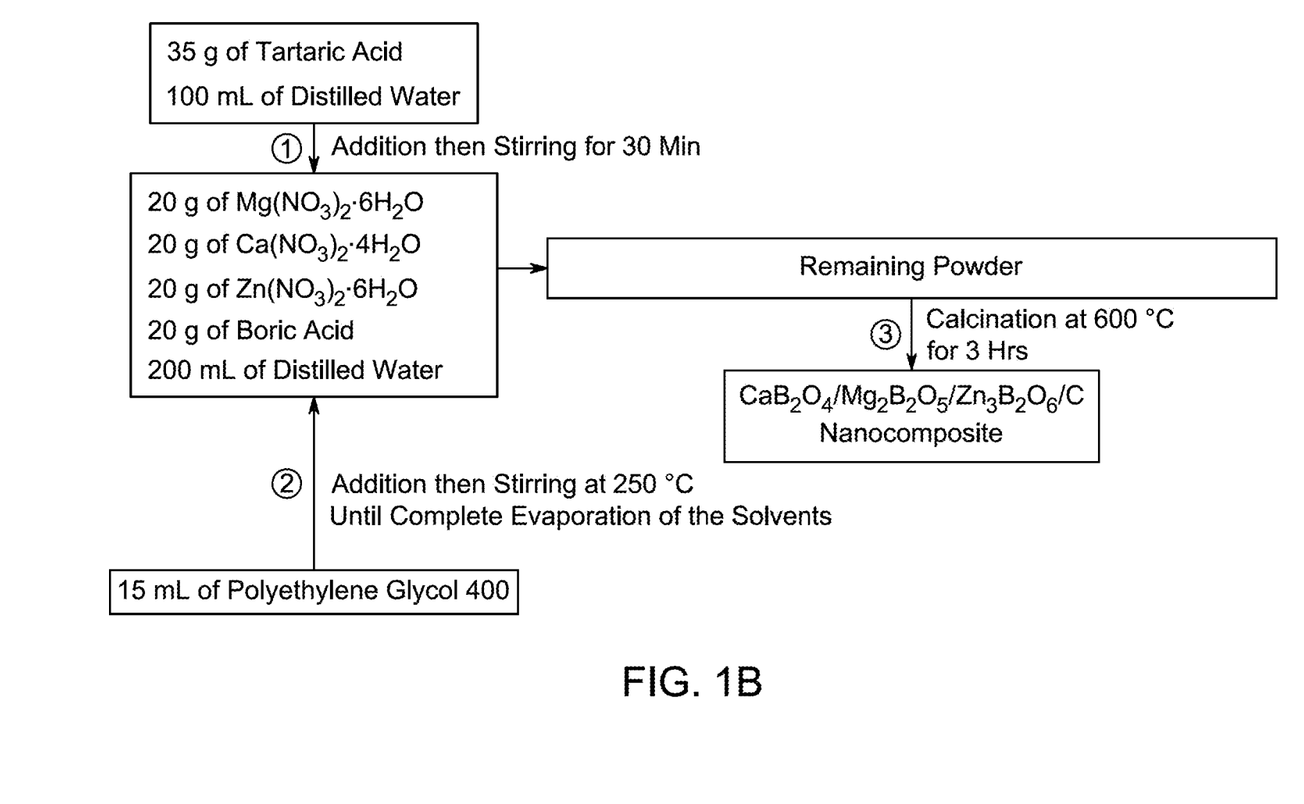
FIG. 1B illustrates an exemplary block diagram depicting the method of producing the $CaB_2O_4/Mg_2B_2O_5/Zn_3B_2O_6/C$ nanocomposite material, according to certain embodiments.

According to the present disclosure, the $CaB_2O_4/Mg_2B_2O_5/Zn_3B_2O_6/C$ nanocomposite was synthesized using a Pechini sol-gel method, as described in FIG. 1B. Firstly, the method includes dissolving 35 grams (g) of tartaric acid ($C_4H_6O_6$) in 100 milliliters (mL) of distilled water (DW) to prepare the first solution. Separately, 20 grams (g) each of magnesium nitrate hexahydrate (Mg$(NO_3)_2 \cdot 6H_2O$), calcium nitrate tetrahydrate (Ca$(NO_3)_2 \cdot 4H_2O$), zinc nitrate hexahydrate (Zn$(NO_3)_2 \cdot 6H_2O$), and boric acid ($H_3BO_3$) were dissolved in 200 mL of distilled water to obtain the second solution. The tartaric acid solution was then added to the nitrate-boric acid solution under continuous stirring for 30 minutes. Subsequently, 15 mL of polyethylene glycol 400 (PEG 400, $H(OCH_2CH_2)_nOH$) was introduced into the mixture, and the resulting solution was stirred continuously at 250° C. until complete evaporation of the solvents occurred, forming a dry powder residue. The obtained dry powder was then calcinated at 600° C. for 3 hours to yield the final $CaB_2O_4/Mg_2B_2O_5/Zn_3B_2O_6/C$ nanocomposite.

Figure 2:
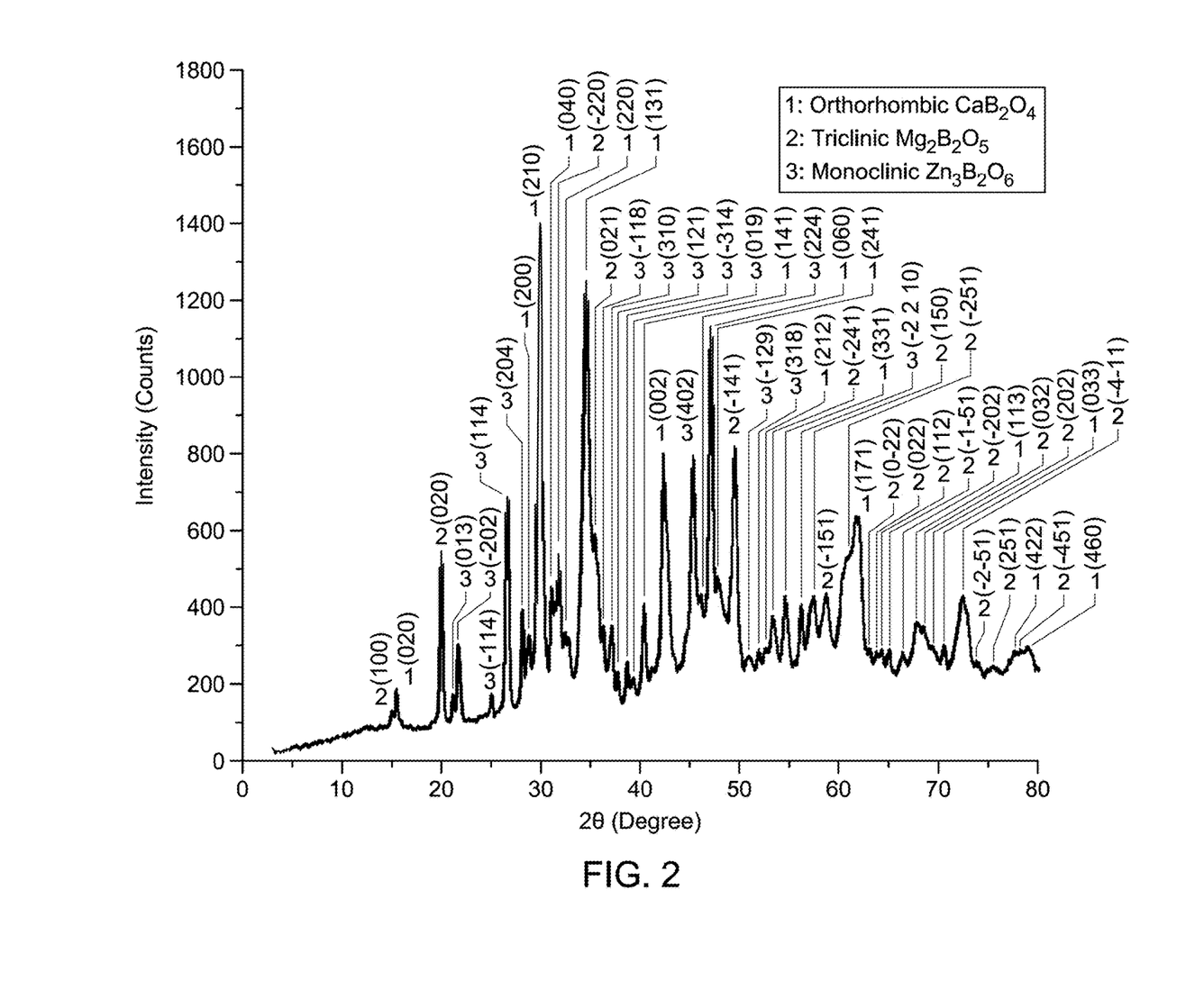
FIG. 2 is a graph depicting X-ray diffraction (XRD) pattern of the $CaB_2O_4/Mg_2B_2O_5/Zn_3B_2O_6/C$ nanocomposite material, according to certain embodiments.

The X-ray diffraction (XRD) pattern for the nanocomposite is shown in FIG. 2. The nanocomposite includes three phases identified as: orthorhombic $CaB_2O_4$ based on JCPDS card No. 00-022-0522, the disclosure of which is incorporated herein by reference in its entirety; triclinic $Mg_2B_2O_5$, based on JCPDS card No. 01-083-0625 the disclosure of which is incorporated herein by reference in its entirety; and, monoclinic $Zn_3B_2O_6$ based on JCPDS card No. 00-027-0983, the disclosure of which is incorporated herein by reference in its entirety. Further, the crystallographic and structural properties of the nanocomposite components as determined by XRD, listed in Table 1. For the diffraction pattern designated as the orthorhombic $CaB_2O_4$ phase, the diffraction peaks were observed at 200 values of 15.32°, 28.75°, 29.80°, 30.95°, 32.41°, 34.51°, 40.40°, 42.49°, 47.00°, 47.73°, 52.57°, 54.46°, 61.69°, 67.78°, 70.41°, 77.65°, and 78.91°, which corresponded to the Miller indices (020), (200), (210), (040), (220), (131), (141), (002), (060), (241), (212), (331), (171), (113), (033), (422), and (460), respectively. The diffraction peaks for the triclinic $Mg_2B_2O_5$ phase appear at 200 values of 14.90°, 19.94°, 31.68°, 35.35°, 49.41°, 53.29°, 57.29°, 58.66°, 60.85°, 62.85°, 63.69°, 64.11°, 64.95°, 66.41°, 68.42°, 69.15°, 72.39°, 73.76°, 75.44°, and 78.18°, corresponded to the Miller indices (100), (020), (−220), (021), (−141), (−241), (150), (−151), (−251), (0-22), (022), (112), (−1-51), (−202), (032), (202), (−4-11), (−2-51), (251), and (−451), respectively. The diffraction peaks for the monoclinic $Zn_3B_2O_6$ phase occurred at 200 values of 21.08°, 21.72°, 24.86°, 26.54°, 28.110, 36.09°, 37.03°, 37.67°, 38.610, 39.23°, 45.33°, 45.95°, 50.89°, 51.84°, and 56.14°, which match the Miller indices (013), (−202), (−114), (114), (204), (−118), (310), (121), (−314), (019), (402), (224), (−129), (318), and (−2 2 10), respectively. The average crystallite size of the nanocomposite was 80.67 nm.

Table 1: Structural and crystallographic properties of the nanocomposite components as determined by XRD.

| | Components of the nanocomposite | | | | Average crystallite size of the nanocomposite (nm) |
|---|---|---|---|---|---|
| Phase | Chemical name | Card No. | Crystal system | Phase | |
| $CaB_2O_4$ | Calcium borate | JCPDS-00-022-0522 | Orthorhombic | $CaB_2O_4$ | 80.67 |
| $Mg_2B_2O_5$ | Magnesium borate | JCPDS-01-083-0625 | Triclinic | $Mg_2B_2O_5$ | |
| $Zn_3B_2O_6$ | Zinc borate | JCPDS-00-027-0983 | Monoclinic | $Zn_3B_2O_6$ | |

Figure 3:
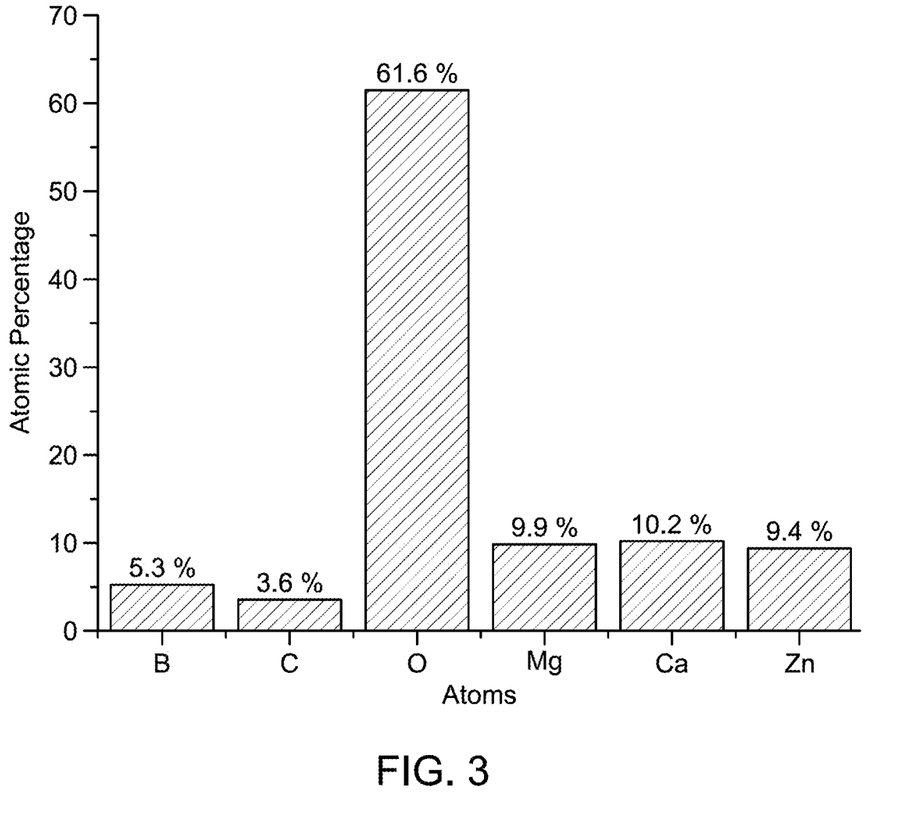
FIG. 3 is a graph depicting the distribution of atomic percentages of elements in the $CaB_2O_4/Mg_2B_2O_5/Zn_3B_2O_6/C$ nanocomposite material, as determined by energy dispersive X-ray spectroscopy (EDX), according to certain embodiments.

Further, the atomic percentage distribution of elements in the nanocomposite, as determined by energy-dispersive X-ray spectroscopy (EDX), is shown in FIG. 3. The results showed that oxygen (O) has the highest atomic percentage at 61.6%, followed by calcium (Ca) at 10.2%, magnesium (Mg) at 9.9%, zinc (Zn) at 9.4%, boron (B) at 5.3%, and carbon (C) at 3.6%. The presence of carbon was attributed to residual carbon from the tartaric acid and polyethylene glycol 400 used as complexing agents and polymerizing agents in the Pechini sol-gel synthesis method. During the synthesis, incomplete combustion or decomposition of these organic precursors may result in small amounts of carbon being retained in the sample. The significant oxygen content reflects the formation of metal borates, which are oxygen-rich structures. The observed elemental distribution highlighted the successful incorporation of the constituent elements into the nanocomposite structure.

Figure 4:
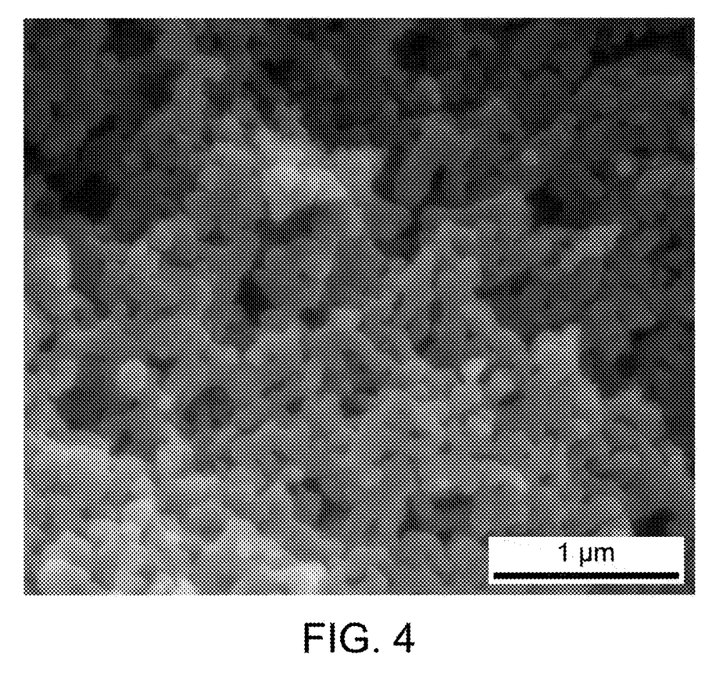
FIG. 4 shows a scanning electron microscope (SEM) image of the $CaB_2O_4/Mg_2B_2O_5/Zn_3B_2O_6/C$ nanocomposite material, at a resolution of 1 micrometer (μm), according to certain embodiments.

The scanning electron microscope (SEM) image of the synthesized $NiO/CaB_2O_4/MgB_2O_4/Ni/C$ nanocomposite revealed the surface morphology, as shown in FIG. 4. The image displayed an agglomeration of particles with irregular spherical and granular shapes distributed across the surface. The nanocomposite exhibited a uniform distribution of these particles, indicating successful synthesis and homogeneous growth. The average grain size of the nanocomposite was 95.64 nm, confirming the nanoscale nature of the particles. This morphology was consistent with materials synthesized using the Pechini sol-gel method, which facilitates the formation of fine grains through controlled polymerization and thermal decomposition processes.

Figure 5:
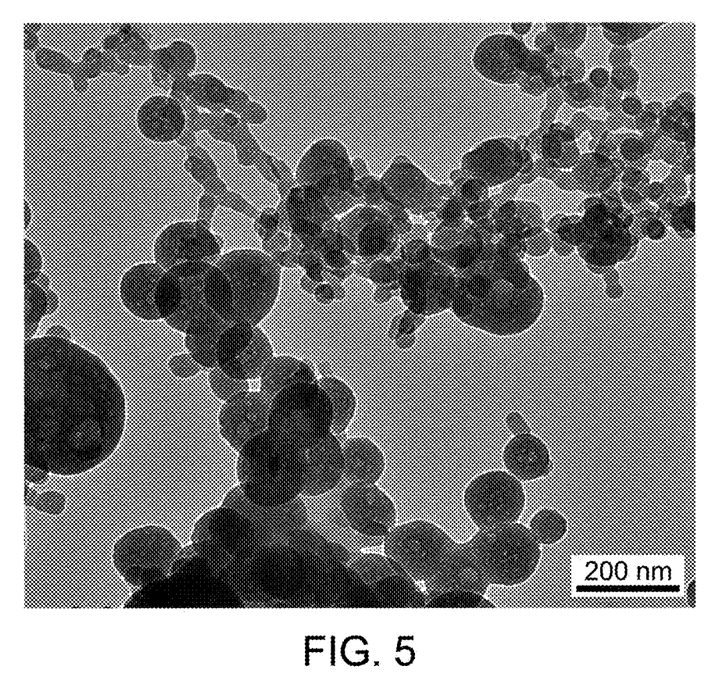
FIG. 5: shows a high-resolution transmission electron microscope (HRTEM) image of the $CaB_2O_4/Mg_2B_2O_5/Zn_3B_2O_6/C$ nanocomposite material, at a resolution of 200 nanometer (nm), according to certain embodiments.

Further, FIG. 5 showed the high-resolution transmission electron microscope (HRTEM) image of the nanocomposite, revealing the morphology and particle structure at the nanoscale. The image clearly confirmed spherical and nearly spherical-shaped particles, which appeared interconnected or agglomerated, forming a chain-like network. The observed particles exhibited smooth surfaces and well-defined boundaries, indicating high crystallinity and uniformity in shape. The average particle diameter of the nanocomposite was 73.23 nm, confirming its nanoscale dimensions. This morphology aligns with the expected outcomes of the Pechini sol-gel method, which promotes the formation of well-dispersed and controlled spherical particles.

Aspects of present disclosure provide for the fabrication of a $CaB_2O_4/Mg_2B_2O_5/Zn_3B_2O_6/C$ nanocomposite using the Pechini sol-gel method, achieving an efficient approach to overcoming challenges in material synthesis. The XRD analysis confirmed the presence of: orthorhombic calcium borate; triclinic magnesium borate; and, monoclinic zinc borate phases, the nanocomposite having an average crystallite size of 80.67 nm, indicating high crystallinity and uniformity of the nanocomposite. The SEM analysis revealed agglomerated particles with irregular spherical and granular shapes, distributed uniformly across the surface, with an average grain size of 95.64 nm, demonstrating the nanoscale nature of the material. The HRTEM images further validated the morphology and particle structure, showing interconnected or agglomerated spherical particles with smooth surfaces and an average particle diameter of 73.23 nm, confirming well-defined nanoscale features. The EDX results highlighted the atomic composition, with: oxygen at 61.6 atom %; calcium at 10.2 atom %; magnesium at 9.9 atom %; zinc at 9.4 atom %; boron at 5.3 atom %; and, carbon at 3.6 atom %, emphasizing successful synthesis and the formation of oxygen-rich metal borates. The present disclosure provided a sustainable and effective method for synthesizing nanocomposites with enhanced structural and functional properties, marking a significant advancement in advanced material fabrication.

The present disclosure provides a nanocomposite with enhanced properties tailored for industrial and environmental applications. Conventional synthesis techniques for comparable materials frequently encounter challenges such as excessive energy consumption, inconsistent particle distribution, and limited control over morphology and crystallinity. The innovative approach of the present disclosure overcomes these problems by enabling the facile fabrication of an advanced $CaB_2O_4/Mg_2B_2O_5/Zn_3B_2O_6/C$ nanocomposite under controlled conditions. The present method ensured uniform particle distribution, nanoscale precision, and high crystallinity while significantly reducing energy requirements and process complexity. The resulting nanocomposite demonstrated enhanced structural and morphological properties, including optimal particle size, high purity, and superior homogeneity by making it ideal for advanced functional applications. This advancement not only resolved the inefficiencies of existing technologies but also paves the way for more sustainable and cost-effective production methods, aligning with the growing demand for innovative materials with minimal environmental impact.

The $CaB_2O_4/Mg_2B_2O_5/Zn_3B_2O_6/C$ nanocomposite holds potential for water purification, effectively adsorbing heavy metal ions and other inorganic and organic pollutants Additionally, the nanocomposite is promising for catalytic processes and as a reinforcement material in advanced ceramics, improving mechanical strength and thermal stability for industrial applications. Additionally, the nanocomposite is promising for catalytic processes and as a reinforcement material in advanced ceramics, improving mechanical strength and thermal stability for industrial applications.

Numerous modifications and variations of the present disclosure are possible in light of the above teachings. It is, therefore, to be understood that within the scope of the appended claims, the invention may be practiced otherwise than as specifically described herein.

The invention claimed is:

1. A particulate nanocomposite material comprising, as determined by X-ray diffraction:
  elemental carbon;
  an orthorhombic $CaB_2O_4$ crystalline phase;
  a triclinic $Mg_2B_2O_5$ crystalline phase; and,
  a monoclinic $Zn_3B_2O_6$ crystalline phase,
wherein, based on the total number of atoms in the nanocomposite material:
  the atomic concentration of carbon (C) is from about 1 to about 5 atom %;
  the atomic concentration of boron (B) is from about 1 to about 10 atom %;
  the atomic concentration of magnesium (Mg) is from about 5 to about 15 atom %;
  the atomic concentration of calcium (Ca) is from about 5 to about 15 atom %; and,
  the atomic concentration of zinc (Zn) is from about 5 to about 15 atom %.

2. The particulate nanocomposite material according to claim 1, wherein, based on the total number of atoms in the nanocomposite material:
  the atomic concentration of carbon (C) is from about 1 to about 4 atom %;
  the atomic concentration of boron (B) is from about 2 to about 8 atom %;
  the atomic concentration of magnesium (Mg) is from about 6 to about 12 atom %;
  the atomic concentration of calcium (Ca) is from about 6 to about 12 atom %; and,
  the atomic concentration of zinc (Zn) is from about 6 to about 12 atom %.

3. The particulate nanocomposite material according to claim 1 having a volume average crystallite size, as determined by X-ray diffraction, of from about 75 to about 85 nm.

4. The particulate nanocomposite material according to claim 1 having a volume average crystallite size, as determined by X-ray diffraction, of from about 79 to about 81 nm.

5. The particulate nanocomposite material according to claim 1 comprising substantially spherical particles and agglomerates thereof.

6. The particulate nanocomposite material according to claim 1 comprising linear agglomerates of substantially spherical particles.

7. The particulate nanocomposite material according to claim 1, wherein granular particles are distributed on the surface of the linear agglomerates.

8. A method for preparing the particulate nanocomposite material as defined in claim 1, the method comprising:
  forming an aqueous mixture by adding an aqueous solution of a chelating agent to an aqueous solution of a magnesium salt, a calcium salt, a zinc salt and boric acid;
  adding a polyol into the aqueous mixture to form a gel;
  heating the gel under stirring at a temperature of from about 200° C. to about 400° C. for a sufficient duration to form a dry powder; and, calcining the dry powder at a temperature of from about 500° C. to about 800° C. to form the nanocomposite material.

9. The method according to claim 8, wherein the aqueous solution of the chelating agent is added in a dropwise manner into the aqueous solution of the magnesium salt, the calcium salt, the zinc salt and boric acid.

10. The method according to claim 8, wherein:
the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$);
the zinc salt is selected from the group consisting of zinc sulfate ($ZnSO_4$), zinc nitrate ($Zn(NO_3)_2$), zinc chloride ($ZnCl_2$) and zinc acetate ($Zn(CH_3COO)_2$); and,
the calcium salt is selected from the group consisting of calcium sulfate ($CaSO_4$), calcium nitrate ($Ca(NO_3)_2$), calcium chloride ($CaCl_2$) and calcium acetate ($Ca(CH_3COO)_2$).

11. The method according to claim 8, wherein:
the magnesium salt is magnesium nitrate ($Mg(NO_3)_2$);
the zinc salt is zinc nitrate ($Zn(NO_3)_2$); and,
the calcium salt is calcium nitrate ($Ca(NO_3)_2$).

12. The method according to claim 8, wherein the chelating agent comprises at least one hydroxyalkyl carboxylic acid selected from the group consisting of citric acid, tartaric acid, malic acid, mandelic acid and 12-hydroxystearic acid.

13. The method according to claim 8, wherein the chelating agent consists of tartaric acid.

14. The method according to claim 8, wherein the polyol is added in a dropwise manner into the aqueous mixture.

15. The method according to claim 8, wherein the polyol has a number average molecular weight (Mn) of from about 200 to about 5000 g/mol. and an hydroxyl number of from about 25 to about 500 mg KOH/g.

16. The method according to claim 8, wherein the polyol is selected from the group consisting of: polyester polyols; polyether polyols; poly(ether-ester) polyols; poly(alkylene carbonate) polyols; and, mixtures thereof.

17. The method according to claim 8, wherein the polyol comprises a polyoxy($C_2$-$C_3$)alkylene polyol.

18. The method according to claim 17, wherein the polyol comprises a polyoxy($C_2$-$C_3$)alkylene polyol having a number average molecular weight (Mn) of from about 200 to about 5000 g/mol. and an hydroxyl number of from about 25 to about 500 mg KOH/g.

19. A method of immobilizing inorganic contaminants disposed in an aqueous medium, the method comprising contacting the aqueous medium with the particulate nanocomposite material as defined in claim 1.

20. A method of degrading organic pollutants disposed in an aqueous medium, the method comprising contacting the aqueous medium with the particulate nanocomposite material as defined in claim 1 while irradiating the aqueous medium with actinic irradiation.

* * * * *